May 7, 1963 M. STAUNT 3,088,745
PLASTIC BUR SLEEVE FOR DENTAL HANDPIECES
Filed Aug. 30, 1961 3 Sheets-Sheet 1

INVENTOR.
Martin Staunt.
BY Robert H. Wendt
Attorney.

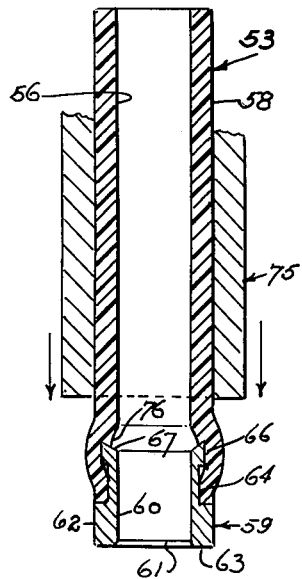
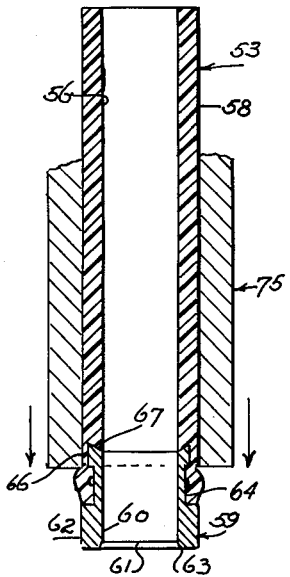
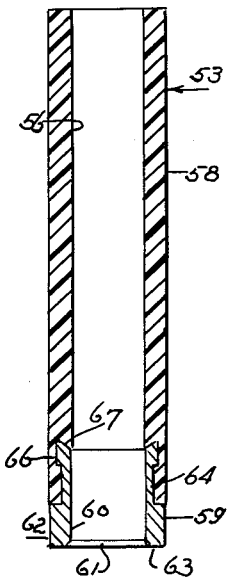
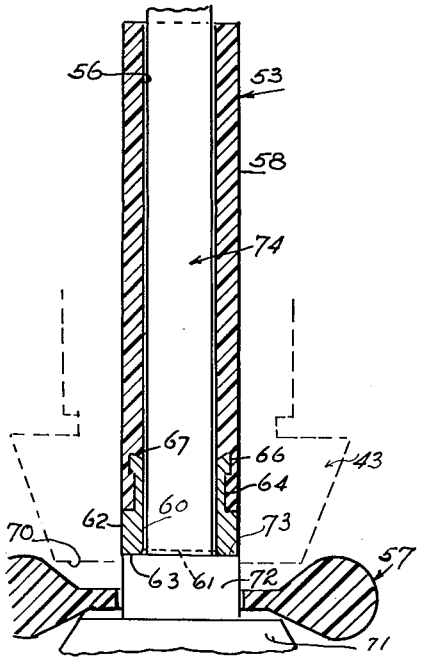
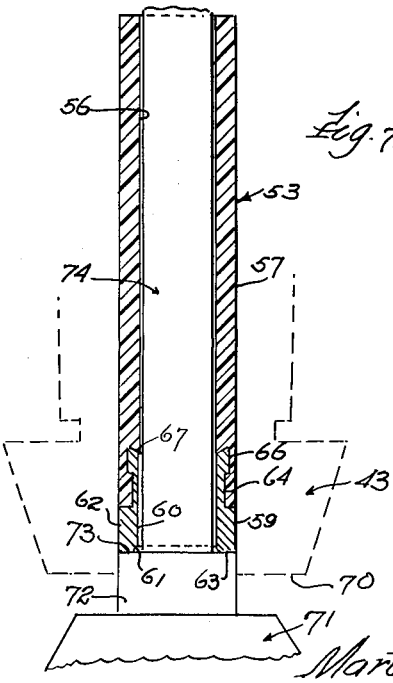

May 7, 1963 M. STAUNT 3,088,745
PLASTIC BUR SLEEVE FOR DENTAL HANDPIECES
Filed Aug. 30, 1961 3 Sheets-Sheet 3
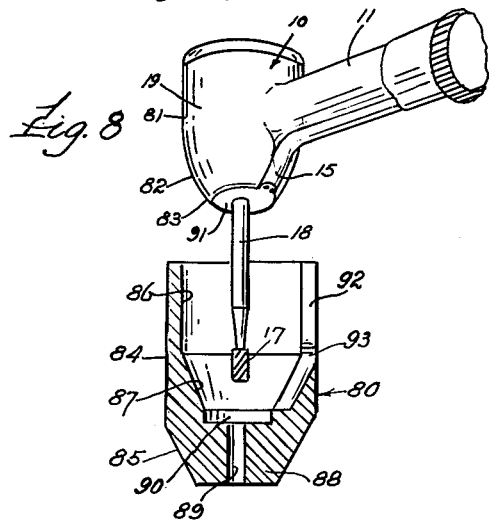
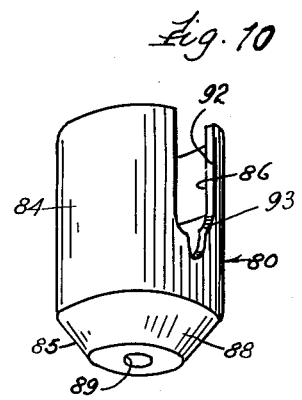
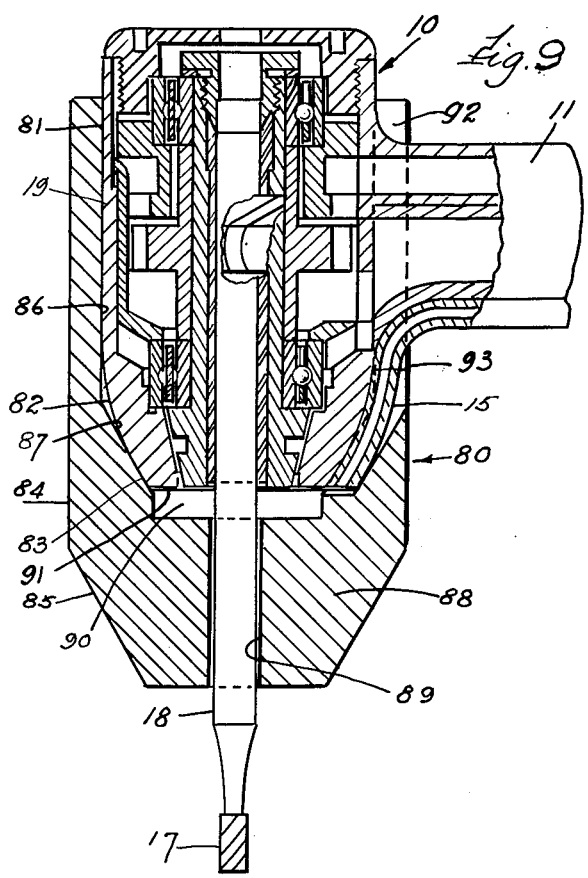
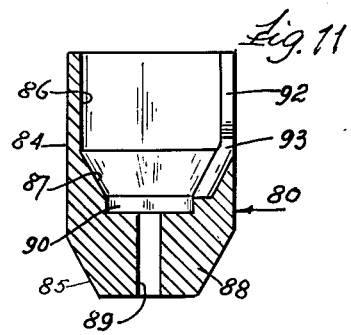
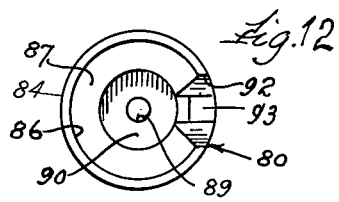
INVENTOR.
Martin Staunt.
BY Robert H. Wendt,
Attorney.

United States Patent Office 3,088,745
Patented May 7, 1963

3,088,745
PLASTIC BUR SLEEVE FOR DENTAL
HANDPIECES
Martin Staunt, Des Plaines, Ill.
(1980 N. Hawthorne Ave., Melrose Park, Ill.)
Filed Aug. 30, 1961, Ser. No. 135,019
14 Claims. (Cl. 279—102)

The present invention relates to plastic bur sleeves for dental handpieces, and is particularly concerned with improvements in the plastic bur sleeves which are used as chucks of the type covered by my prior Patents No. 2,983,519, issued May 9, 1961, and 2,989,317, issued June 20, 1961, on Chucks for Dental Handpieces.

One of the objects of the invention is the provision of an improved chuck of the class described which eliminates the possibility of the replacement of a bur sleeve in an off center position, as may occur when a new chuck sleeve is forced in carelessly by a dentist with the devices of the prior art.

Another object of the invention is the provision of an improved plastic bur sleeve which is provided with a metal insert for guiding and centering the bur as its shank is being pushed into the bur tube and in which the metal insert holds the bur in accurately centered position during drilling so that concentricity being assured there is less possibility of any vibration.

Another object of the invention is the provision of an improved plastic bur sleeve for use as a chuck in which there is a metal insert engaging and guiding the bur shank during its insertion and in which the shank of the bur is also held by the plastic sleeve, absorbing vibration from the drilling, the plastic gripping the bur firmly and the metal insert preventing the bur from being pressed in off center position, thus lengthening the life of the bur sleeve tube.

Another object of the invention is the provision of an improved plastic bur sleeve for use as a chuck in which the sleeve is provided with a metal insert which is firmly anchored in the sleeve and which can be accurately made to size and concentricity so that the operation of inserting a bur shank is made faster and easier.

Another object of the invention is the provision of an improved plastic bur sleeve which is simple in construction, which has a minimum number of parts, which may be manufactured at a low cost, and which may be used for a longer period of time and provided with a plastic head for ease in handling or utilized without the plastic head.

Another object of the invention is the provision of an improved method of making a plastic bur sleeve having a metal insert and an improved method of anchoring the insert in the sleeve.

Another object of the invention is the provision of an improved fixture adapted to be mounted on the head of an air driven dental handpiece and used to guide a bur shank into a plastic bur sleeve used as a chuck in such manner as to assure the location of the bur shank in an accurately centered position.

Other objects and advantages of the invention will be apparent from the following description and the accompanying drawings, in which similar characters of reference indicate similar parts throughout the several views.

Referring to the three sheets of drawings accompanying this specification,

FIG. 3 is a fragmentary sectional view illustrating the step of inserting the metal insert in the plastic sleeve;

FIG. 4 is a similar view showing the next step of anchoring the metal insert in the plastic sleeve;

FIG. 5 is a similar view showing the finished bur sleeve with metal insert;

FIG. 6 is a similar view showing the step of removal of the plastic head from the bur sleeve;

FIG. 7 is a similar view showing the seating of the plastic bur sleeve with metal insert inside the bur tube to prevent interference with the water spray.

FIG. 8 is a fragmentary view in perspective and partial section showing the application of an improved fixture which is adapted to be fitted on the head of an air driven dental handpiece and used for guiding the bur shank into an accurately centered position;

FIG. 9 is a fragmentary sectional view taken through a plane passing through the axis of the shank;

FIG. 10 is a view in perspective of the improved fixture;

FIG. 11 is a sectional view similar to FIG. 8;

FIG. 12 is a top plan view of FIG. 11.

Figure 1:
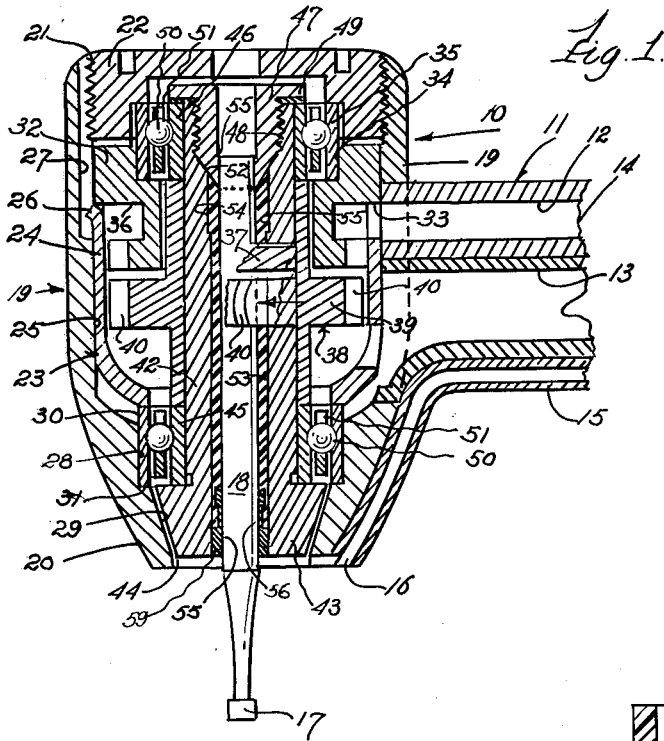
FIG. 1 is an axial sectional view taken through the head of an air driven dental handpiece having a bur tube embodying the invention, on an enlarged scale.

Referring to FIG. 1, 10 indicates in its entirety the head of an air driven dental handpiece as an example of a device utilizing the invention. This dental handpiece has a laterally extending handle 11 provided with a drive air conduit 12 and an exhaust air conduit 13, inside a cylindrical body 14, which has air and water conduits 15 brazed to its lower side and terminating in separate air and water nozzles 16 directed toward the bur 17, the shank 18 of which is mounted in one of the present plastic bur sleeves.

The handle 11 carries a substantially cylindrical head 19 which is tapered at 20 at its lower end; and the cylindrical head 19 is provided with a threaded bore 21 at its upper end closed by a threaded cap 22.

The head 19 forms a housing for a turbine unit 23 which is mounted in a separate inner casing 24 of cylindrical shape fitting in a cylindrical bore 25 in the housing 19 and secured against rotation by an outwardly turned tab 26, engaging in an axial slot 27.

The housing 19 is provided with a cylindrical bore 28 at its lower end communicating with a frusto-conical bore 29; and the outer race 30 of a lower ball bearing unit is mounted in bore 28 against annular shoulder 31.

The turbine 23 has a stator 32 of cylindrical shape fitting in the housing 19 and engaging the inner casing 24 at the annular shoulder 33; and the stator 32 has an axial bore 34 in its upper end receiving the outer race 35 of an upper ball bearing which is engaged by cap 22, clamping the outer races in the housing.

The turbine unit 23 has its stator 32 provided with an annular groove 36 communicating with the drive air conduit 12 and conducting air to a multiplicity of slots 37 serving as nozzles projecting air diagonally and axially toward the rotor 38.

Rotor 38 has a cylindrical body 39 provided with curved slots 40 forming blades to receive the drive air which drives the rotor toward the left at the front of FIG. 1, as indicated by the arrow; and the rotor has tubular spacers 41, 42 provided with a bore receiving a tubular shaft 42.

Tubular shaft 42 has a frusto-conical head 43 having a clearance in the frusto-conical bore 29, providing a conical air nozzle 44 which projects drive air toward the bur 17 for cooling. The tubular shaft 42 supports the inner races 45, 46 which are engaged by the tubular spacers 41, 42 of the rotor; and the inner races and rotor are clamped on the shaft 42 by a screw plug 47 threaded into a threaded bore 48 in the shaft and having a flange 49 and a washer clamping the inner races on the shaft.

Each ball bearing unit has a plurality of balls 50 in its race grooves; and the balls are spaced by a plastic spacer tube 51 having slots and bores for receiving the balls to hold them spaced from each other.

The screw plug 47 also has a beveled lower end 52 which engages the upper end of a plastic sleeve 53 and expands it into an enlargement 54 in the cylindrical bore 55 of the shaft 42, anchoring the plastic sleeve in the shaft.

The plug 47 and cap 22 have registering apertures for the insertion of a mandrel to push the bur shank out of the head; and the bur shank extends into the bore 55 in the screw plug 47 for accurately centering the upper end of the shank.

Figure 2:
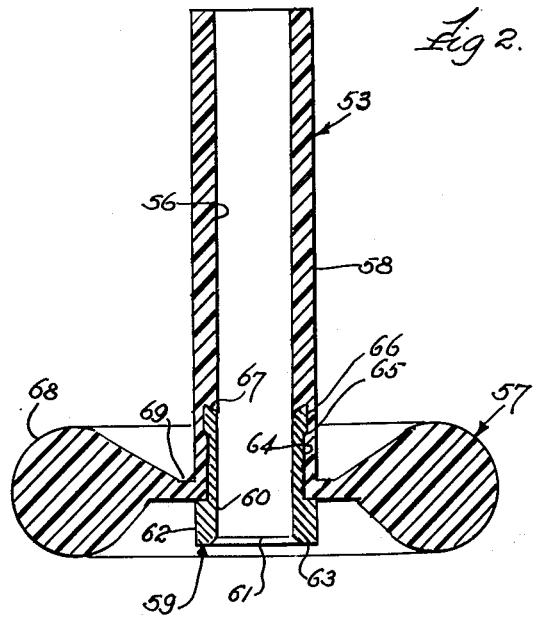
FIG. 2 is an axial sectional view taken trough a plastic bur sleeve provided with a metal insert and with a circular head for ease in handling.

The plastic sleeve 53 may be of the type shown in FIG. 2 initially provided with the disc 57 for ease in handling or it may be of the type shown in FIG. 5, in which the plastic sleeve 53 is used without the disc 57. In any event, the plastic sleeve, when installed in the bur shaft 42, is provided with the inner cylindrical bore 56 and an outer cylindrical surface 58.

The plastic bur sleeve is preferably made of plastic material, such as Teflon; and the external cylindrical surface 58 has a frictional fit in the bore 55 of the shaft, while the bore 56 of the plastic sleeve is of a size which frictionally grips the shank 18 of the bur 17.

The plastic sleeve 53 (FIG. 2) is provided with a stainless steel metal insert 59 having a cylindrical bore 60 with a chamfered entry 61 at its lower end. The metal insert has an external cylindrical surface 62 and a plane end surface 63; and it is provided with a reduced cylindrical portion 64 which is anchored in the plastic sleeve 53 by an annular shoulder 65 at a slightly larger portion 66.

The metal insert preferably has an inwardly beveled end surface 67 which tends to facilitate the anchoring operation, as will appear from the further views showing the method of its manufacture.

The disc 57 is preferably formed with a circular rim 68 integrally attached to the plastic sleeve 53 by a thinner body 69 which is adapted to be severed or fractured in the operation of driving the plastic sleeve into the shaft bore, as shown in FIG. 6.

In some embodiments of the invention the disc 57 may be eliminated, as shown in FIG. 5; and in any event the end of the plastic sleeve assembly including the metal insert is preferably forced into the metal shaft 42 until the end surface 63 is below the end of the shaft enlargement 43, the end of which is indicated at 70. This prevents interference of the plastic sleeve with the water spray, which is projected from one of the nozzles 16.

The mandrel which is used to insert the plastic sleeve in the shaft is provided with an enlarged handle 71 and a reduced cylindrical portion 72 with an annular shoulder 73, the corner of which removes the disc 57 from the plastic sleeve.

A cylindrical extension 74 on the mandrel extends into the plastic sleeve and maintains its concentricity.

Referring now to FIGS. 3–5, the metal insert is assembled with the plastic sleeve by forcing it into the sleeve while the plastic sleeve is supported in a tapered metal sleeve 75, as shown in FIG. 3; and the stainless steel bushing 59 is heated and pressed into the soft plastic sleeve 53.

The tapered metal sleeve 75 is then forced over the plastic sleeve and over that part of the plastic sleeve which has the stainless steel bushing in it, as shown in FIG. 4, driving the plastic into the groove 76 behind the annular shoulder 67 and forcing the plastic into intimate contact with the reduced cylindrical portion 64 during the process shown in FIG. 4.

The resulting plastic sleeve with metal insert is shown in FIG. 5, in which the metal insert is firmly locked inside the plastic sleeve.

Referring to FIG. 8, this is a view in perspective and partial section showing the same dental handpiece 10 having the same handle 11 and carrying the bur 17 provided with a shank 18. The handpiece head 19 is shown in connection with an improved fixture 80 which fits on the head 19 and is adapted to guide the shank 18 of bur 17 into an accurately centered position.

The head 19 has a cylindrical body 81 which curves inward at 82 and merges with a tapered frusto-conical portion 83. The neck of the handle 11 is substantially cylindrical except that air and water spray conduits 15 are brazed to the neck and the frusto-conical body 83.

The fixture 80 comprises a substantially cylindrical body 84 of metal, such as stainless steel having a frusto-conical lower portion 85. The body 84 has a cylindrical bore 86 and a frusto-conical bore 87; and it has a lower thickened wall 88 provided with a bore 89 for slidably receiving the bur shank 18.

There is a clearance at 90 in the fixture below the lower end 91 of the head; and the frusto-conical bore 87 guides the fixture into accurately centered position on the head 19, assisted by the cylindrical bore 86.

The fixture 80 has a lateral parallel walled slot 92 for passing the handle 11; and the lower wall of the fixture may be provided with a clearance 93 for the air and water nozzles.

The guide bore 89 for the shank 18 is accurately centered when the fixture 80 is mounted on the head 19; and while the bore 89 may fit the shank 18 with about 2/1000 clearance on the regular size handpieces, on a fixture for a miniature handpiece the bore 89 may be 10/1000 oversize and still perform its guiding function efficiently in the latter case, where the bur may be slightly larger than the shank.

The present fixture is adapted to eliminate any possibility of a bur shank being pushed into the plastic chuck sleeve carelessly to an off center position; and thus it accomplishes the same function as the metal insert 59 (FIG. 2); but the fixture may be employed with or without the metal insert.

When the plastic sleeve with metal insert is inserted in the shaft bore, the plastic is caused to expand at the upper end into the enlargement 54, anchoring the plastic sleeve in the shaft bore.

The advantages of the present construction are as follows:

(1) The stainless metal insert will center the bur and guide it as it is being pushed into the bur tube.

(2) With good concentricity of the bur to the bur tube there will be less vibration.

(3) The metal holds the bur in the center during drilling.

(4) The soft plastic sleeve absorbs vibration from the drilling.

(5) The soft plastic grips the bur firmly.

(6) The metal insert prevents the bur from being pressed in off center, hence lengthens the life of the bur tube sleeve several times.

(7) A very essential quality of this metal insert is that it is accurately made to size and concentricity.

(8) The retention between the metal and plastic is important and is effective in its present design.

(9) It is faster and easier to center the bur.

(10) The bur rotates faster when the bur runs true.

It will thus be observed that I have invented an improved plastic bur sleeve with a metal insert which may be employed in all kinds of dental handpieces, air driven or gear driven, and which may be used with or without the circular disc or head.

It will be practically impossible for anyone who is installing a new plastic sleeve to damage the concentricity of the bore at the end of the plastic sleeve, since it has the stainless steel insert at that end.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. A replaceable chuck sleeve for holding the shank of dental burs or the like, comprising a cylindrical tube of plastic having a concentric axial bore adapted to grip a cylindrical bur shank frictionally, said sleeve having at its outer end a metal inner sleeve provided with an accurately concentric cylindrical bore flush with the inner surface of the axial bore carried in the bore of the tube for centering and guiding a bur shank as it is being pushed into the tube.

2. A replaceable chuck sleeve according to claim 1, in which the inner sleeve is provided with outer anchoring formations for securing the inner sleeve in the plastic tube.

3. A replaceable chuck sleeve according to claim 2, in which the anchoring formations are at each end of the metal inner sleeve.

4. A replaceable chuck sleeve according to claim 1, in which the metal inner sleeve is located at the extreme outer end of the plastic outer sleeve.

5. A replaceable chuck sleeve according to claim 4, in which said metal inner sleeve has inner and outer cylindrical surfaces and the inner and the outer metal sleeve surfaces are flush with the inner and outer surfaces of the plastic tube.

6. A replaceable chuck sleeve according to claim 1, in which the chuck sleeve has a frangible finger disc at its outer end.

7. A dental handpiece having an accurately concentric chuck sleeve for centering a bur shank, comprising a round housing head having a cylindrical bore, a pair of ball bearing assemblies mounted in the ends of said cylindrical bore, a tubular shaft supported by said ball bearing assemblies, and having a cylindrical bore, a plastic sleeve frictionally mounted in said bore and having a concentric cylindrical bore, for receiving a bur shank, a metal sleeve insert in the lower end of said plastic sleeve and having a concentric cylindrical bore registering with the bore of the plastic sleeve, said sleeve insert guiding a bur shank into centered position during the insertion of the bur shank.

8. A dental handpiece according to claim 7, in which the shaft has an upper threaded member provided with a cylindrical bore receiving and centering the upper end of the bur.

9. A dental handpiece according to claim 8, in which lateral thrust on the bur is resisted by the metal insert at the lower end of the shaft and by the upper end of the bur shank seated in the cylindrical bore in said threaded member.

10. A guiding assembly for use in inserting an accurately concentric chuck sleeve, comprising a round housing having an axial cylindrical bore, a pair of ball bearing assemblies mounted in the ends of said cylindrical bore, a tubular shaft rotatably supported by said ball bearing assemblies, said housing having an opening at one end exposing said shaft, an accurately concentric cylindrical bore in said shaft, a guide fixture having a cylindrical bore for receiving said round housing and having an end wall provided with a concentric cylindrical guide bore, said guide bore being of substantially the same size as the cylindrical bore in said shaft and being in registry with the bore in the shaft when the guide fixture is mounted on said housing, said guide fixture directing a plastic chuck sleeve into accurately concentric position in said shaft.

11. A guiding assembly according to claim 10, in which the round housing is provided with a tapered frusto-conical surface surrounding its open end and the cylindrical socket in said fixture is provided with a complementary frusto-conical inner surface guiding the fixture into concentric position on said housing.

12. A guiding assembly according to claim 11, in which the socket is also provided with a clearance extension between the bottom wall and said frusto-conical surface.

13. A guiding assembly according to claim 10, in which the housing is provided with a laterally projecting handle and the fixture is provided with a top open groove for receiving said handle.

14. A fixture for guiding an accurately concentric chuck sleeve into concentric position in a dental handpiece shaft, comprising a metal member which is provided with a socket for receiving the head of a dental handpiece, the said socket having a concentric cylindrical bore and a frusto-conical bore communicating with the cylindrical bore and an end wall, the top of said socket being open, said cylindrical bore receiving the handpiece head with a slight tolerance, and said frusto-conical bore being adapted to fit accurately upon a frusto-conical portion of the head, said end wall being provided with an elongated centrally located smaller cylindrical bore located concentrically with the cylindrical socket and the frusto-conical bore and being of a size adapted to receive and guide a plastic chuck sleeve axially into the handpiece head in concentric position, said socket being provided with a clearance on the inner side of its end wall and with a lateral groove for receiving the handle of the handpiece head.

References Cited in the file of this patent

UNITED STATES PATENTS

| | | |
|---|---|---|
| 1,450,189 | Smith | Apr. 3, 1923 |
| 2,105,618 | Silva | Jan. 18, 1938 |
| 2,989,317 | Staunt | June 20, 1961 |